United States Patent
Shin

(10) Patent No.: US 11,347,837 B2
(45) Date of Patent: May 31, 2022

(54) METHOD AND APPARATUS FOR ENHANCING SECURITY OF VEHICLE CONTROLLER

(71) Applicant: HYUNDAI AUTOEVER CORP., Seoul (KR)

(72) Inventor: Eun-Ho Shin, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 162 days.

(21) Appl. No.: 16/703,504

(22) Filed: Dec. 4, 2019

(65) Prior Publication Data
US 2020/0184066 A1 Jun. 11, 2020

(30) Foreign Application Priority Data
Dec. 7, 2018 (KR) .......................... 10-2018-0156523

(51) Int. Cl.
| | | |
|---|---|---|
| G06F 21/46 | (2013.01) | |
| G06F 9/30 | (2018.01) | |
| G06F 9/4401 | (2018.01) | |
| G06F 21/12 | (2013.01) | |

(52) U.S. Cl.
CPC .......... *G06F 21/46* (2013.01); *G06F 9/30007* (2013.01); *G06F 9/4403* (2013.01); *G06F 21/121* (2013.01)

(58) Field of Classification Search
CPC ...... G06F 21/46; G06F 21/121; G06F 21/575; G06F 9/4403; G06F 9/30007
See application file for complete search history.

(56) References Cited

FOREIGN PATENT DOCUMENTS

| KR | 10-2013-0006963 A | 1/2013 |
|---|---|---|
| KR | 10-2015-0064474 A | 6/2015 |
| KR | 10-2015-0065003 A | 6/2015 |
| KR | 10-2016-0092496 A | 8/2016 |
| KR | 10-1806719 B1 | 12/2017 |
| KR | 10-2018-0049523 A | 5/2018 |

OTHER PUBLICATIONS

Korean Office Action dated Oct. 23, 2020 from the corresponding Korean Application No. 10-2018-0156523, 7 pp.
Korean Office Action dated Feb. 11, 2020 from the corresponding Korean Application No. 10-2018-0156523, 5 pp.
Article, "TinySafeBoot—Yet another Bootloader for AVR-ATtinys", from http://jtxp.org/tech/tinysafeboot_en.htm, 10 pages, printed on Feb. 10, 2020.

*Primary Examiner* — Dao Q Ho
(74) *Attorney, Agent, or Firm* — Lempia Summerfield Katz LLC

(57) ABSTRACT

A method for enhancing the security of a vehicle controller includes: performing, by a microcontroller, a secure boot when a vehicle controller is powered on and booted; determining, by the microcontroller, whether the secure boot is for a reprogramming mode or an other operation mode, among a plurality of operation modes of the vehicle controller, when the secure boot is completed; performing, by the microcontroller, a password input step, generating an error password, and automatically inputting the error password when the secure boot is for an operation mode other than the reprogramming mode from the plurality of operation modes of the vehicle controller; and jumping, by the microcontroller, to a main software (SW) routine immediately when the error password is inputted.

8 Claims, 2 Drawing Sheets

METHOD AND APPARATUS FOR ENHANCING SECURITY OF VEHICLE CONTROLLER

CROSS-REFERENCE TO RELATED APPLICATION

Figure 1:
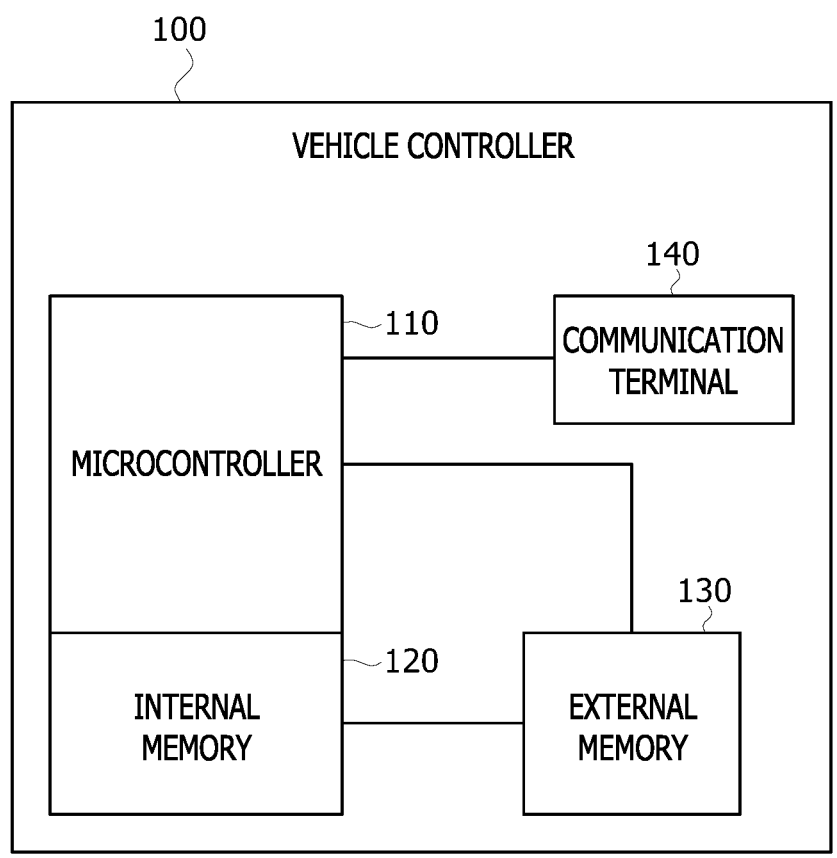

This application claims priority to and the benefit of Korean Patent Application No. 10-2018-0156523, filed on Dec. 7, 2018, the entire contents of which are incorporated herein by reference in its entirety.

FIELD

The present disclosure relate to a method and an apparatus for enhancing the security of a vehicle controller.

BACKGROUND

The statements in this section merely provide background information related to the present disclosure and may not constitute prior art.

Recently, the automobile industry has been using more electronic control devices than mechanical devices, and the trend of using more electronic control devices continues. A growing number of electronic control devices operate through software and help a vehicle to operate more accurately and safely.

As described above, a plurality of electronic control devices for controlling various functions of the vehicle may be integrated and implemented in a vehicle controller.

For example, an engine control unit (ECU) as an electronic control device (also known as, the vehicle controller) operates like the heart of a vehicle, and when the engine control unit is hacked, it may cause serious damage to the engine and the vehicle, and thus may put a passenger's life at risk.

Therefore, efforts for substantially preventing the hacking of the engine control unit have been continued, and a further enhanced anti-hacking technology of the engine control unit is being applied at present.

For example, a security function to substantially prevent the hacking of the engine control unit includes secure debug, a flash read/write prohibit function and the like. The security function is a function available after the engine control unit is unlocked by inputting a password. That is, when anyone knows a password, the person can unlock the secure debug, and also the flash read/write prohibit function and the like.

In such a case, it is not easy to find out the password, but it is not completely impossible. For example, as a hacker repeatedly inputs a password after the engine control unit is booted, the engine control unit may be unlocked at some points, and thus the engine control unit may be hacked. This problem is not limited to the engine control unit and may occur in a plurality of vehicle controllers included in a vehicle.

SUMMARY

Various forms of the present disclosure are directed to a method and an apparatus for enhancing the security of a vehicle controller, in which a deliberate error password is allowed to be automatically inputted during the boot of the vehicle controller in order to substantially prevent hacking in a method of repeatedly inputting a password until the vehicle controller is unlocked, so that it is possible to block a password input opportunity for hacking in advance to enhance security.

In one form, a method for enhancing the security of a vehicle controller includes: performing, by a microcontroller, a secure boot when a vehicle controller is powered on and booted; determining, by the microcontroller, whether the secure boot is for a reprogramming mode or other operation mode, among a plurality of operation modes of the vehicle controller, when the secure boot is completed; performing, by the microcontroller, a password input step, generating an error password, and automatically inputting the error password when the secure boot is for an operation mode other than the reprogramming mode from the plurality of operation modes of the vehicle controller; and jumping, by the microcontroller, to a main software (SW) routine immediately when the error password is inputted.

In the password input step, a password is implemented to be inputted only once.

The error password is generated during each secure boot using an error password generation program implemented in advance, or after any one error password is stored in advance, the stored error password is inputted during each secure boot.

The other operation mode except for the reprogramming mode allows access to some changeable information stored in an external memory in the vehicle controller.

In another form, an apparatus for enhancing the security of a vehicle controller includes: a microcontroller configured to: execute an engine control program stored in an external memory in the vehicle controller, and execute firmware stored in an internal memory included in the microcontroller so as to perform in a communication mode and a plurality of operation modes including a reprograming mode. In particular, the microcontroller is further configured to determine whether the vehicle controller is booted in an operation mode, among the plurality of operation modes, other than the reprograming mode. When it is determined that the vehicle controller is booted an operation mode other than the reprograming modes, the microcontroller is configured to: perform a password input step, generate an error password, and automatically input the generated error password during a boot process for the operation mode, except for the reprogramming mode of the vehicle controller In a case where the vehicle controller is powered on and booted and a secure boot is completed, the microcontroller performs the password input step based on the firmware stored in the internal memory, and proceeds to a main software (SW) routine immediately after the error password is inputted during the boot process.

In the password input step, the password is implemented to be inputted only once.

The error password is generated each time when the vehicle controller is booted for an operation mode, among the plurality of operation modes, other than the reprogramming mode using an error password generation program executed by the microcontroller, or after any one error password is stored in advance, the stored error password is inputted every time when the vehicle controller is booted for the operation mode other than the reprograming mode from the plurality of operation modes.

The operation mode except for the reprogramming mode allows access to some changeable information stored in the external memory in the vehicle controller.

In accordance with the exemplary forms of the present disclosure, a deliberate error password is allowed to be automatically inputted during the boot of the vehicle controller in order to substantially prevent hacking through repeatedly inputting a password until the vehicle controller is unlocked, so that it is possible to block a password input opportunity for hacking in advance, thereby enhancing security.

Further areas of applicability will become apparent from the description provided herein. It should be understood that the description and specific examples are intended for purposes of illustration only and are not intended to limit the scope of the present disclosure.

DRAWINGS

Figure 2:
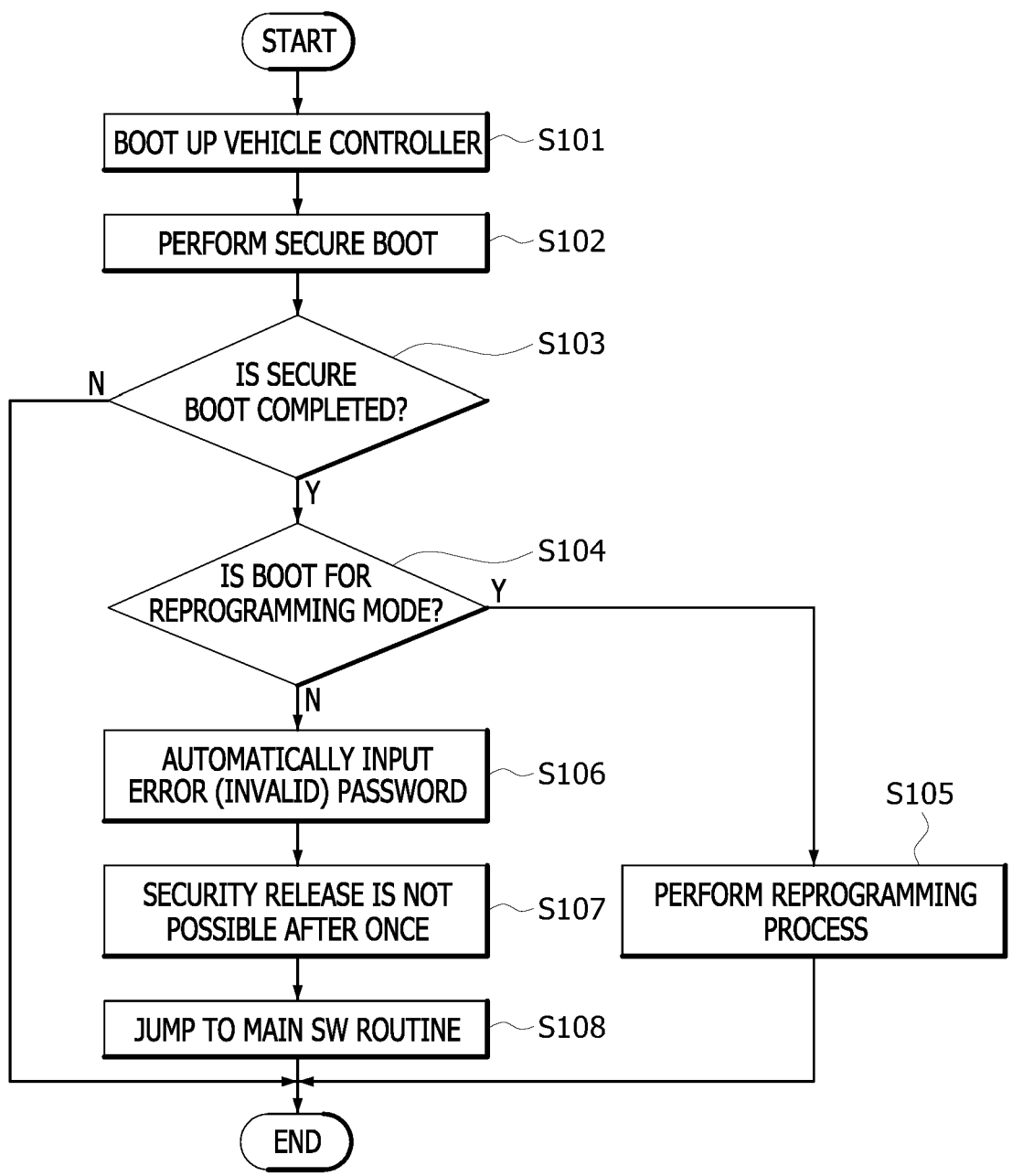

In order that the disclosure may be well understood, there will now be described various forms thereof, given by way of example, reference being made to the accompanying drawings, in which:

FIG. 1 is a diagram schematically illustrating the configuration of a vehicle controller; and FIG. 2 is a flowchart for explaining a method for enhancing the security of the vehicle controller.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As is traditional in the corresponding field, some exemplary forms may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary forms may be physically separated into two or more interacting and discrete blocks, units, and/or modules without departing from the scope of the inventive concept. Further, blocks, units, and/or module of some exemplary forms may be physically combined into more complex blocks, units, and/or modules without departing from the scope of the inventive concept.

Hereinafter, a method for enhancing the security of a vehicle controller in accordance with one form of the present disclosure will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

FIG. 1 is a diagram schematically illustrating the configuration of a vehicle controller in one form of the present disclosure.

As illustrated in FIG. 1, a vehicle controller 100 has a microcontroller 110 and an external memory 130 (For example, a flash EPROM) therein.

In one form, the microcontroller 110 includes an internal memory 120 therein, and the external memory 130 stores a specific engine control program.

The internal memory 120 of the microcontroller 110 stores a plurality of codes (or firmware) related to a communication program, a programming mode, and a boot operation mode for communicating with an external diagnostic device (not illustrated) through a communication terminal (or a communication port) 140 when storing (updating) the specific engine control program in the external memory 130.

The communication terminal (or the communication port) 140 may connect the external diagnostic device (not illustrated) or a reprogramming device (not illustrated).

The microcontroller 110 and the external memory 130 are connected to each other through an address bus and a data bus, and the external memory 130 is fixedly installed inside the vehicle controller 100.

The codes (or firmware) stored in the internal memory 120 are stored in an initial production stage (or a factory production stage) of the vehicle controller 100.

Some implementation in accordance with the present disclosure relate to the codes (or firmware) stored in the internal memory 120.

The vehicle controller 100 includes a plurality of operation modes (for example, a reprogramming mode, a normal mode and the like), and in the related art, reprogramming is possible after security authentication only for the reprogramming mode among the plurality of operation modes.

Accordingly, in the related art, a hacker may access the other modes (for example, the normal mode and the like), except for the reprogramming mode among the plurality of operation modes of the engine control unit 100, and perform hacking (for example, setting value change, initial value change, correction value change and the like) for an area of some changeable information stored in the external memory 130.

However, in the related art, there is no method capable of substantially preventing hacking the other modes (for example, the normal mode and the like) except for the reprogramming mode, among the plurality of operation modes, of the engine control unit 100.

In this regard, the present disclosure provides a method capable of blocking hacker's access to the area of some changeable information stored in the external memory 130 by improving the codes (or firmware) stored in the internal memory 120.

Hereinafter, with reference to FIG. 2, an operation of the microcontroller 110 based on the codes (or firmware) stored in the internal memory 120 in one form of the present disclosure will be described.

FIG. 2 is a flowchart for explaining a method for enhancing the security of the vehicle controller in accordance with one form of the present disclosure.

Referring to FIG. 2, when the vehicle controller 100 is powered on and is booted (S101), the microcontroller 110 performs secure boot based on the codes (or firmware) stored in the internal memory 120 (S102).

Then, when the secure boot is completed (Yes in step S103), the microcontroller 110 checks whether the boot is for the reprogramming mode or another mode (for example, the normal mode) (that is, checks a boot mode) (S104).

For example, the vehicle controller 100 is booted in a corresponding mode according to the boot mode (for example, a boot for reprogramming, a boot for applying a changed setting value, a boot for changing a setting value, and the like) set at the previous termination upon booting.

Accordingly, when the boot is a boot mode for the reprogramming as a result of checking the boot mode (Yes in step S104), the microcontroller 110 performs a reprogramming process in which a security function has been already applied (S105). Accordingly, in the present disclosure, the security function of the reprogramming process (or a security operation for reprogramming) will not be described.

However, when the boot is not the boot mode for the reprogramming (that is, the reprogramming mode) as the result of checking the boot mode (No in step S104) (for example, the normal mode), the microcontroller 110 performs a password (or security key) input step, generates an error (invalid) password (or security key), and then automatically inputs the generated error password (S106).

In such a case, the error password may be generated every time at each boot by using a password generation algorithm (not illustrated), or after any one error password is stored in advance, the stored error password may be inputted every time.

In the related art, a separate security function has been applied only when a mode enters the reprogramming mode, any security function for substantially preventing hacking has not been applied to another mode (for example, a mode in which it is possible to access the area of some changeable information stored in the external memory, such as the normal mode), except for the reprogramming mode among the plurality of operation modes of the engine control unit 100. However, in the present form, the password (or security key) is allowed to be inputted in order to access another mode (for example, a mode in which it is possible to access the area of some changeable information stored in the external memory, such as the normal mode), except for the reprogramming mode.

However, in the method of inputting the password (or security key) as described above, locking may be released (or security may be released) by repeatedly inputting a password like the existing hacking method. Accordingly, in the present form, after a boot, an opportunity to input the password (or security key) is given only once, and even the one-time opportunity to input the password (or security key) is eliminated (that is, an error (invalid) password (or security key) is deliberately generated and automatically inputted to eliminate a password input opportunity by a hacker), so that locking release (or security release) by the hacker (or by password input by the hacker) becomes impossible (S107).

As described above, the error (invalid) password (or security key) is generated and automatically inputted in the password (or security key) input step, thereby jumping to a main software (SW) routine immediately while substantially preventing access to the area of some changeable information stored in the external memory 130, such as the normal mode (S108).

As described above, in the present form, in order to substantially prevent hacking in a method of repeatedly inputting a password until locking (or security) of the vehicle controller 100 is released, a deliberate error password is automatically inputted during the boot of the vehicle controller 100, so that it is possible to block a password input opportunity for hacking in advance to enhance security.

As described above, in the present form, the vehicle controller 100 includes the engine control unit (ECU), and also includes a plurality of electronic control units (ECUs) for controlling various functions of a vehicle.

Although the present disclosure have been described with reference to the forms illustrated in the drawings, the forms of the disclosure are for illustrative purposes only, and those skilled in the art will appreciate that various modifications and equivalent other forms are possible. Thus, the true technical scope of the disclosure should be defined by the following claims. Furthermore, the implementations described in the present specification may be implemented with a method or process, an apparatus, a software program, and a data stream or signal, for example. Although discussed only in the context of a single form of implementation (for example, discussed only as a method), implementations of the discussed features may also be implemented as other forms (for example, an apparatus or a program). The apparatus may be implemented with appropriate hardware, software, firmware and the like. The method may be implemented in an apparatus such as a processor generally referring to a processing device including a computer, a microprocessor, an integrated circuit, or a programmable logic device. The processor includes a communication device such as a computer, a cellular phone, a portable/personal digital assistants (PDA), and other devices that facilitate communication of information between end users.

What is claimed is:

1. A method for enhancing security of a vehicle controller, the method comprising:
   performing, by a microcontroller, a secure boot when a vehicle controller is powered on and booted;
   determining, by the microcontroller, whether the secure boot is for a reprogramming mode or an other operation mode, among a plurality of operation modes of the vehicle controller, when the secure boot is completed;
   performing, by the microcontroller, a password input step, generating an error password, and automatically inputting the error password when the secure boot is for an operation mode other than the reprogramming mode, from among the plurality of operation modes of the vehicle controller; and
   jumping, by the microcontroller, to a main software (SW) routine immediately when the error password is inputted.

2. The method according to claim 1, wherein, in the password input step, a password is implemented to be inputted only once.

3. The method according to claim 1, wherein:
   the error password is generated during each secure boot using an error password generation program implemented in advance, or
   after any one error password is stored in advance, the stored error password is inputted during each secure boot.

4. The method according to claim 1, wherein among the plurality of operation modes, the other operation mode except for the reprogramming mode allows access to some changeable information stored in an external memory in the vehicle controller.

5. An apparatus for enhancing security of a vehicle controller, the apparatus comprising:
   a microcontroller configured to:
      perform a secure boot when a vehicle controller is powered on and booted;
      determine whether the secure boot is for a reprogramming mode or an other operation mode, among a plurality of operation modes of the vehicle controller, when the secure boot is completed;

perform a password input step, generate an error password, and automatically input the error password when the secure boot is for an operation mode other than the reprogramming mode, from among the plurality of operation modes of the vehicle controller; and jump to a main software (SW) routine immediately when the error password is inputted.

6. The apparatus of claim 5, wherein the microcontroller is configured to implement a password to be inputted only once when performing the password input step.

7. The apparatus of claim 5, wherein the error password is generated during each secure boot using an error password generation program implemented in advance, or after any one error password is stored in advance, the stored error password is inputted during each secure boot.

8. The apparatus of claim 5, wherein among the plurality of operation modes, the other operation mode except for the reprogramming mode allows access to some changeable information stored in an external memory in the vehicle controller.

\* \* \* \* \*